GEAR SHIFTING APPARATUS

Original Filed Nov. 6, 1963 8 Sheets-Sheet 1

INVENTORS
GEORGE H. HURST
WILLIAM G. CAMPBELL
BY
Louis Nedo
ATTORNEY

GEAR SHIFTING APPARATUS
Original Filed Nov. 6, 1963 8 Sheets-Sheet 2
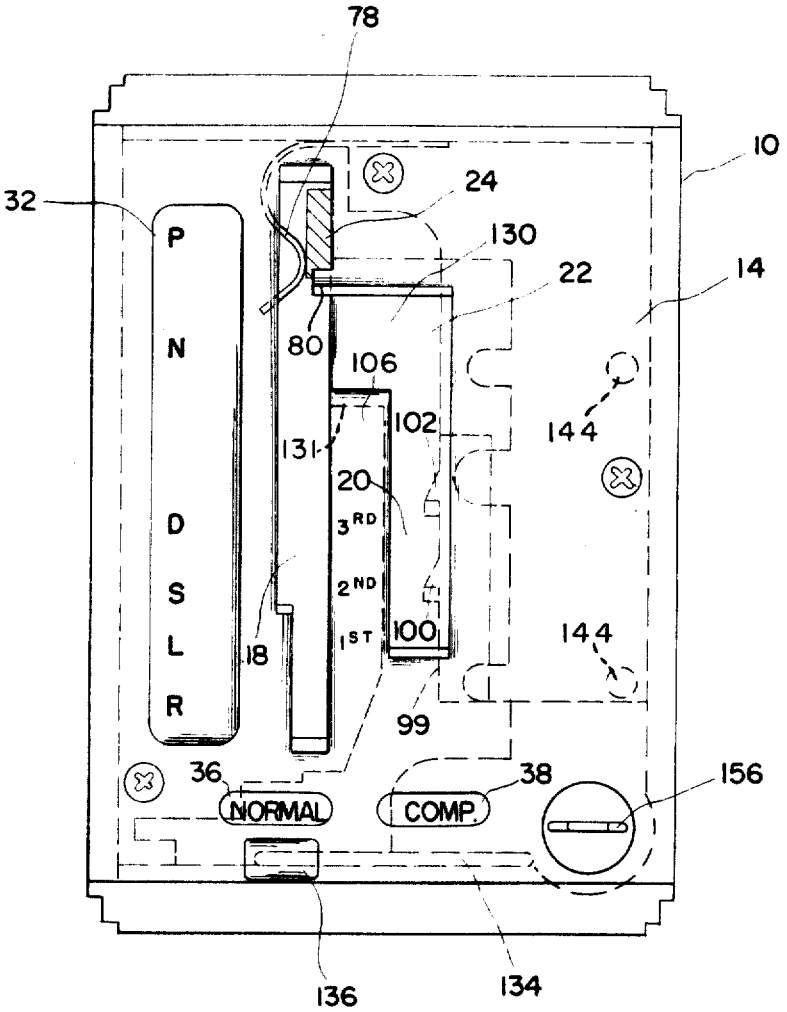
FIG. -1A-
FIG.—6A—
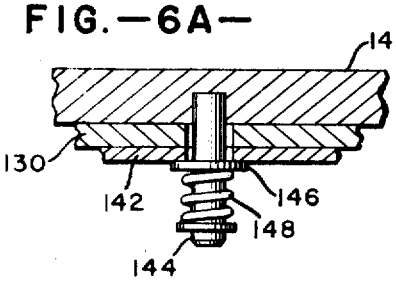
INVENTORS
GEORGE H. HURST
WILLIAM G. CAMPBELL
BY
Louis Neeb
ATTORNEY INVENTORS
GEORGE H. HURST
WILLIAM G. CAMPBELL
BY
Louis Necho
ATTORNEY

GEAR SHIFTING APPARATUS

Original Filed Nov. 6, 1963 8 Sheets-Sheet -

INVENTORS
GEORGE H. HURST
WILLIAM G. CAMPBELL
BY
Louis Necho
ATTORNEY

GEAR SHIFTING APPARATUS

Original Filed Nov. 6, 1963 8 Sheets-Sheet 5

INVENTORS
GEORGE H. HURST
WILLIAM G. CAMPBELL
BY Louis Nedo
ATTORNEY

GEAR SHIFTING APPARATUS

Original Filed Nov. 6, 1963 8 Sheets-Sheet

INVENTORS
GEORGE H. HURST
WILLIAM G. CAMPBELL
BY
ATTORNEY

GEAR SHIFTING APPARATUS

Original Filed Nov. 6, 1963 8 Sheets-Sheet 7

INVENTORS
GEORGE H. HURST
WILLIAM G. CAMPBELL
BY
Louis Neeho
ATTORNEY

GEAR SHIFTING APPARATUS

Original Filed Nov. 6, 1963 8 Sheets-Sheet

INVENTORS
GEORGE H. HURST
WILLIAM G. CAMPBELL
BY
Louis Necho
ATTORNEY

United States Patent Office

Re. 26,884
Reissued May 19, 1970

26,884

GEAR SHIFTING APPARATUS

George H. Hurst, Jr., Jenkintown, and William G. Campbell, Chalfont, Pa., assignors to Hurst Performance, Inc., Warminster, Pa., a corporation of Pennsylvania Original No. 3,292,450, dated Dec. 20, 1966, Ser. No. 321,977, Nov. 6, 1963. Application for reissue Dec. 19, 1968, Ser. No. 787,302

Int. Cl. G05g *1/00*

U.S. Cl. 74—473 13 Claims

Matter enclosed in heavy brackets [ ] appears in the original patent but forms no part of this reissue specification; matter printed in italics indicates the additions made by reissue.

*ABSTRACT OF THE DISCLOSURE*

*A gear shift assembly includes a shift-stick, a first operating channel defined by a slot in a top plate, a second operating channel substantially parallel to the first one and also defined by a slot in the plate with a transverse channel permitting movement of the stick from one channel to the other. A manually movable gate closure plate is provided which, in one position, prevents the stick from moving into the second channel. Also, in at least one of the channels there is a spring-urged member which prevents movement of the stick transverse to its usual shifting path into a predetermined stick position but enables movement of the stick into the predetermined position when the stick is moved along its usual path.*

This invention relates to gear shifting apparatus of the type commonly associated with the automatic transmissions of automotive vehicles.

One object of the invention is to produce an improved gear shifting apparatus of the type set forth.

Conventional gear shifting apparatus of the type set forth includes a shifting stick which is movable in a single slot or gate for shifting the transmission to "low," "park," reverse and neutral position, and to drive position from which an automatic transmission will shift up or down in response to the speed of the vehicle. Such conventional gear shifting mechanisms are satisfactory for normal use where rapid and sustained acceleration is not necessary. But, in racing, or competition driving, only the forward speeds are used and controlled and very rapid and sustained acceleration is necessary. This cannot be attained by an automatic transmission which shifts up and down in response to the speed of the vehicle and independently of the will of the driver.

It is therefore a further object of the invention to produce a gear shifting apparatus having two gates: one which is adapted for use in conventional driving and which includes all of the usual positions enumerated and one which is adapted for use in competition driving and which includes forward speed positions only and in which the automatic up and down shifting mechanism can be locked out.

A still further object is to provide means for selectively locking the gear shifting stick in the position which permits normal driving and out of the position which permits competition driving so as to prevent unintended transfer of the gear shifting handle from one position to the other.

A still further object is to produce a gear shifting apparatus which includes means for preventing unintentional movement of the shift stick, during competitive driving, from one forward gear position to another.

A still further object is to produce a gear shifting apparatus which can be converted from ordinary to competition driving instantly, without any special tools and without any special skill whatever.

A still further object is to produce a gear shifting apparatus which can be incorporated in existing machines as well as in machines of future manufacture, with minimum cost and with minimum interference with the transmission or other mechanisms.

The full nature of the invention will be understood from the following specification and the accompanying drawings in which FIG. 1 is a top plan view of a gear shifting apparatus embodying the invention, with parts broken away to show internal construction, the shifting stick being shown in the third, or high, forward speed position of competitive driving gate.

FIG. 1–A is similar to FIG. 1 but is drawn on a reduced scale and shows the gear shifting stick in the "park" position of the normal, or automatic driving gate.

FIG. 1–B is a reduced bottom view and shows the gear shifting stick in the "park" position of the normal driving gate.

FIG. 1–C is similar to FIG. 1–B but shows shift stick in 2nd forward speed position of the competitive driving gate.

Figure 6:
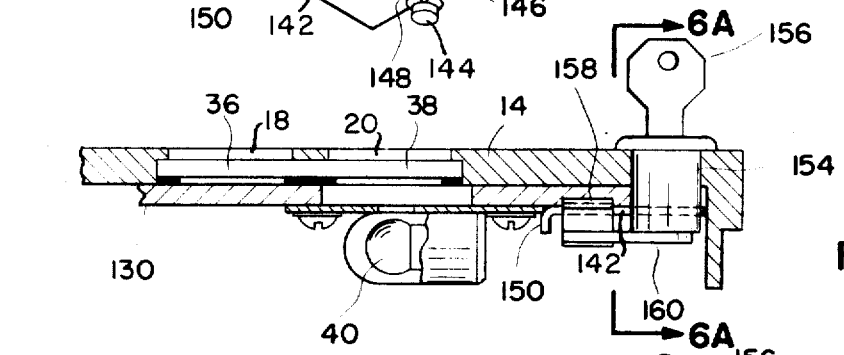
FIG. 6 is a vertical sectional view, taken transversely of the apparatus and showing the position of the parts when the apparatus is used for competition driving.

FIG. 6–A is a sectional view looking in the direction of line 6–A—6–A on FIG. 6.

Figure 7:
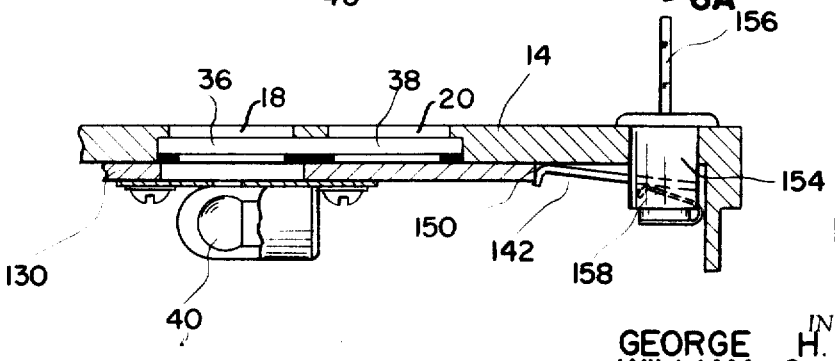

FIG. 7 is a view similar to FIG. 6, showing the position of the parts when the apparatus is used for ordinary driving.

Figure 8:
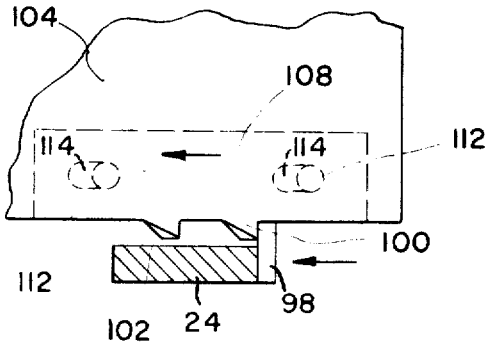
Figure 9:
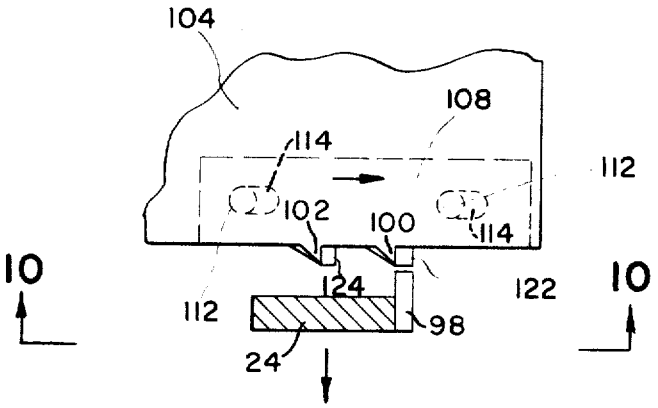

FIGS. 8 and 9 are fragmentary views showing the operation of the gear shifting lever in competition driving.

Figure 10:
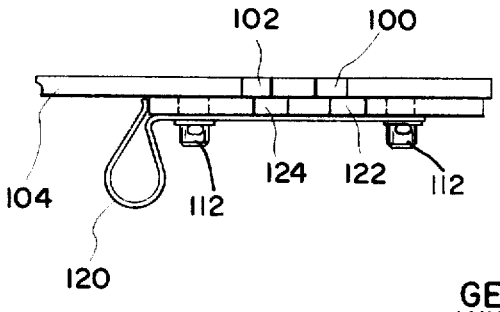

FIG. 10 is a view looking in the direction of line 10—10 on FIG. 9.

Figure 1:
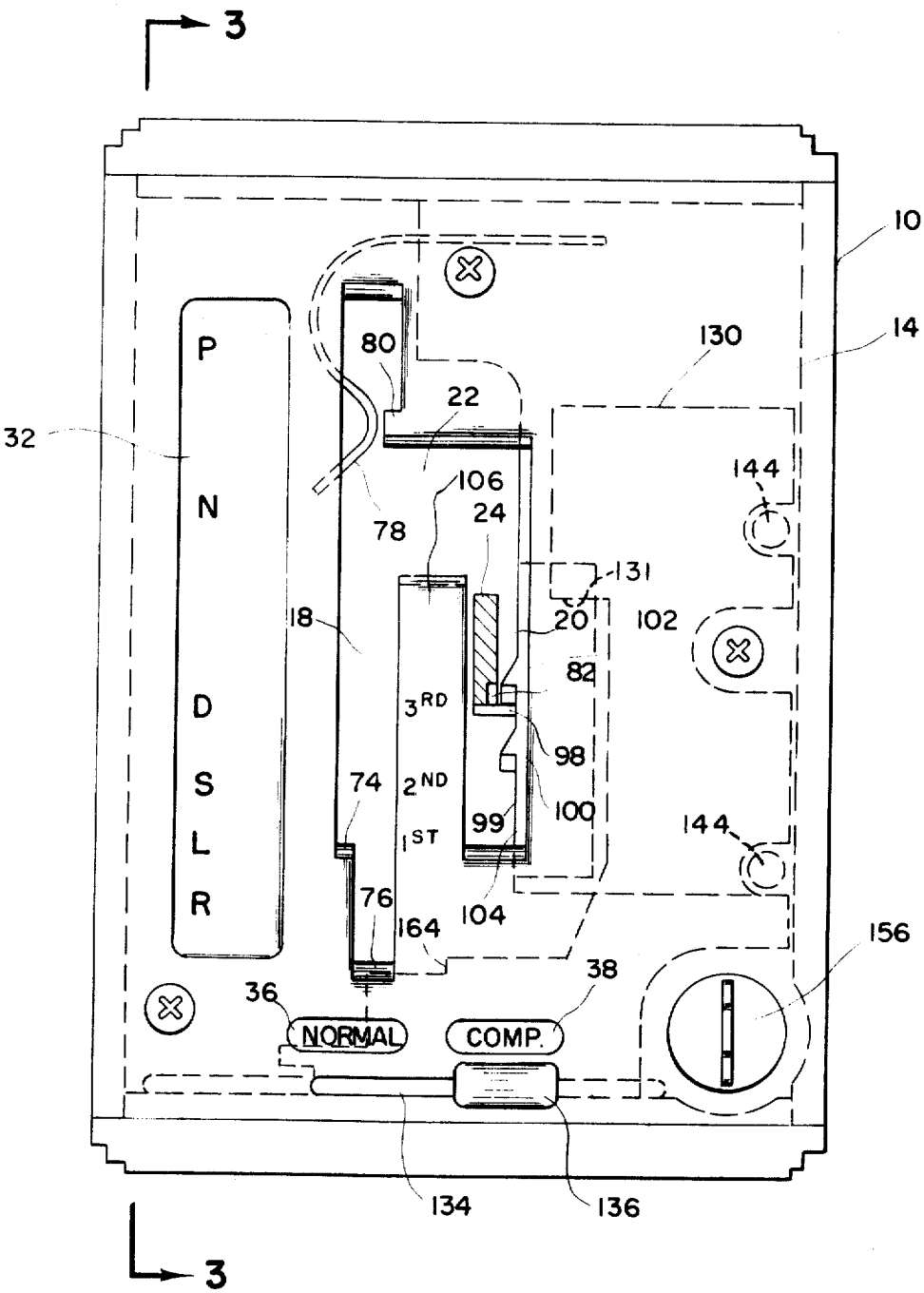
Figure 2:
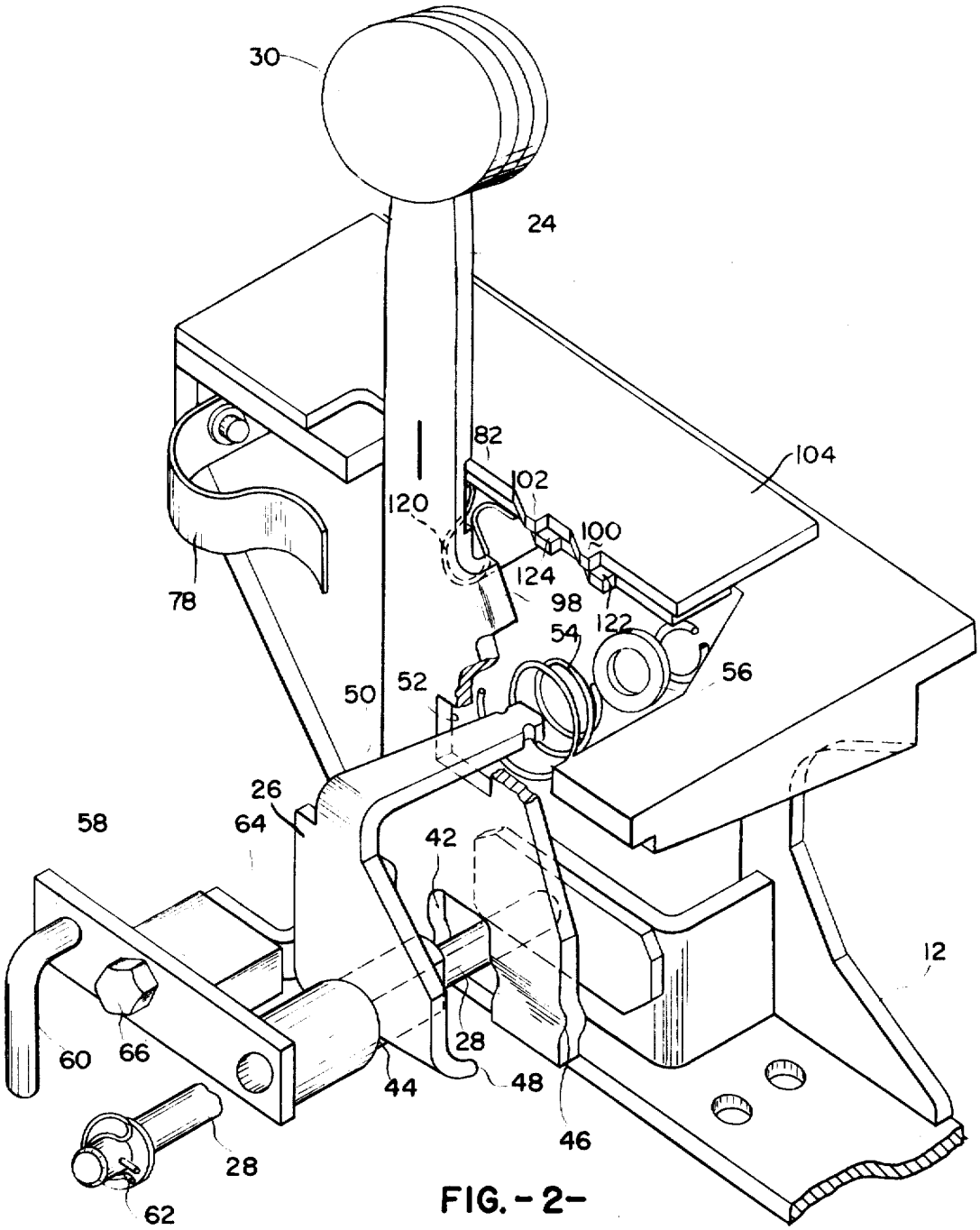
FIG. 2 is a fragmentary, perspective view of a gear shift mechanism embodying the invention.

As best shown in FIGS. 1 and 2, the shifting apparatus of this invention comprises a housing 10 suitably secured to a base 12. Housing 10 includes a top wall 14 in which is formed a generally H-shaped opening consisting of a long slot, or gate 18, for normal driving and, a short slot, or gate 20, for competitive driving which is connected to long slot 18 by a crossover slot 22. The apparatus further includes a gear shift stick 24 which engages a carrier 26 which is rotatable about the axis of shaft 28 which is carried by base 12.

Shift stick 24 may operate in slot 18 or slot 20 and the upper end thereof is provided with a grip knob or handle 30. During normal driving, shift stick 24 is movable through slot 18 from one to the other of the normal positions indicated by D for high speed driving; S for second speed; L for low speed; P for park; N for neutral; and R for reverse, which indicia appears on an escutcheon 32. During competition driving, shift stick 24 is moved in slot 20 from low to second to third and back, or to fourth, speed, should such speed be available, and to neutral. In other words, during competition driving the vehicle can move between forward speed positions only, that is, the gear shift stick can not be moved to park or reverse position. To this end, the portion of top wall 14 adjacent short slot 20 will carry indicia, 1st; 2nd; and 3rd, or similar designations visually to indicate the position of the shifting stick. The various designations mentioned and the designations "normal" and "competition," are rendered visible by the use of translucent plates 36 and 38 and a suitable lamp 40 disposed below said plates and selectively movable into alignment with either of them to illuminate one or the other of said plates as hereinafter explained.

The lower end of shift stick 24 is bifurcated, as best shown in FIG. 2, to provide spaced arms 42 which are adapted to engage oppositely facing flat surfaces on the non-circular portion of the rotatable carrier 26 whereby reciprocation of the shifting stick, transversely of shaft 28, rotates carrier 26. In addition, there is a slight clearance between the surfaces 42 and 44 to permit the shift stick to rock in the direction of the axis of shaft 28. The lower end of shift stick 24 is provided with a recess 46 which receives the bent edge 48 of carrier 26 further to stabilize mounting of the handle. Carrier 26 is further provided with a horizontal arm 50 which extends through an aperture 52 formed in the shift stick 24 and carries compression spring 54 which is confined between the adjacent flat surface of the handle and a washer 56 suitably secured at the end of arm 50. Spring 54 serves to bias the shifting stick in the direction of the axis of shaft 28. See FIG. 4.

Fixedly secured to the outer end of rotary carrier 26 is one end of a lever 58 to the other end of which is pivotally connected a rod 60 which connects the shift stick to the transmission. By this arrangement movement of the shift stick from one position to another changes the gear setting, or ratio or the direction of movement etc. Carrier 26, and its adjuncts, are held in position on stationary shaft 28 by means of a washer and a resilient anti-rattle retainer 62. See FIGS. 2 and 3.

Lever 58 also carries a switch-actuating bracket 64 which is suitably secured thereto as at 66 and which has a slot 69 in arm 68 through which passes the actuating arm 70 of the conventional ignition switch, not shown, whereby the ignition switch may be closed only when the shift stick is in neutral or park position.

As shown in FIG. 1, when shift stick 24 is moved into reverse position, it will, under the influence of spring 54, slide against the left hand edge of slot 18 until it abuts stop 74 whereupon it is necessary to manually move stick 24 laterally to the right before reaching the "reverse" position where further movement of the shift stick is prevented by stop 76. In other words, stop 74 only serves to prevent inadvertent shifting into "Reverse" position. Also movement of stick 24 in long slot 18 from Neutral to "Park" position is resisted by a flat spring 78 which acts yieldably to block the movement of the shift stick in to the "Park" position, and which can be deflected out of blocking position by the exertion of some additional pressure on stick 24. Once shift stick 24 is in "Park" position as shown in FIG. 1–A flat spring 78 exerts a bias opposed to, or greater than, the bias of spring 54, so as to hold the shift stick in the position of FIG. 1 in which notch 82 in the shift stick engages shoulder or stop 80, which is carried by top wall 14, to prevent inadvertent movement of stick 24 out of "Park" position. To get out of "Park" position, it is necessary to move the shift stick against spring 78, or to the left as viewed in FIG. 1 until notch 82 clears stop 80.

Since, except as modified as herein set forth the operation of the shift stick in slot 18 is conventional, it is though to have been sufficiently described.

To carry out the present invention we provide means for locking out the up and down shifting device of the automatic transmission, whenever the shift stick is moved into slot 20, and we provide means for making it impossible unintentionally to move the shift stick from slot 18 to slot 20 and vice versa.

Figure 4:
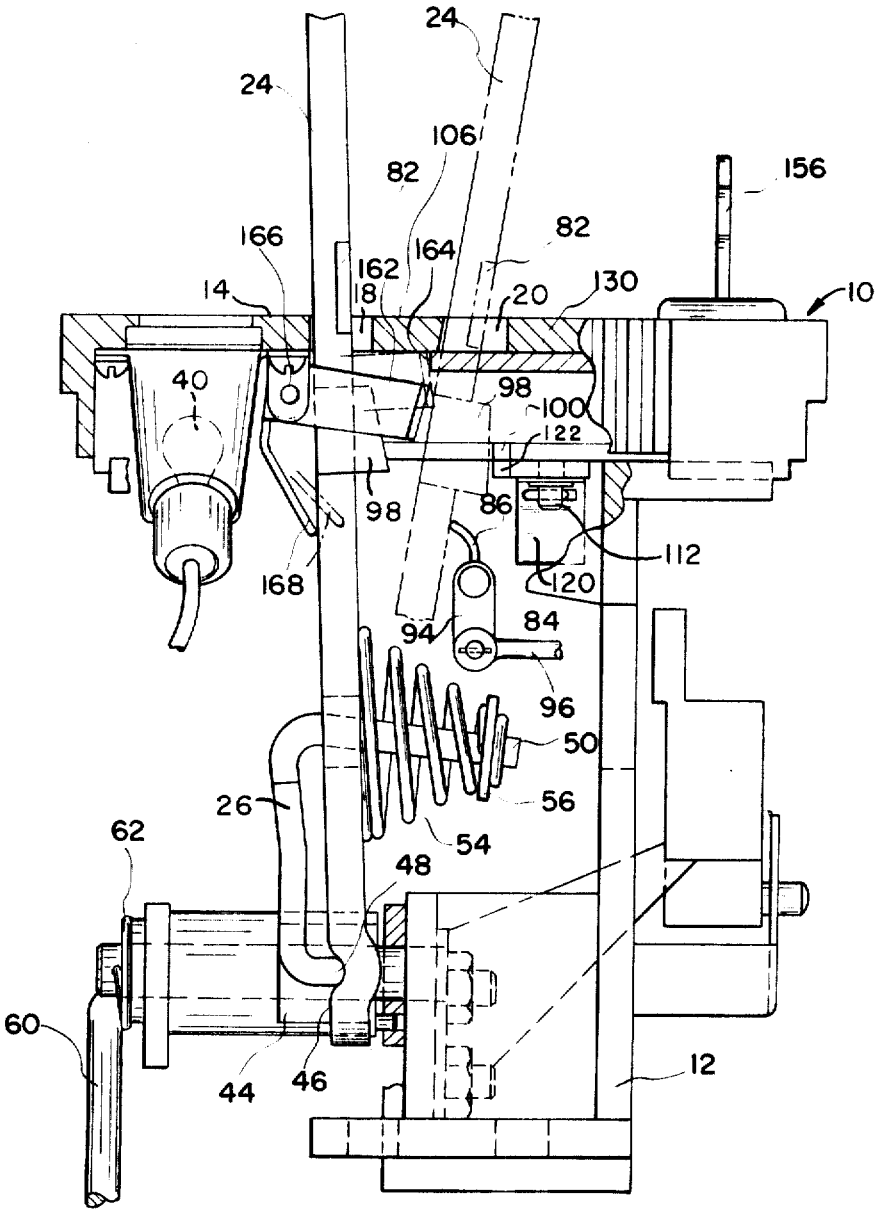
FIG. 4 is a view looking in the direction of line 4—4 on FIG. 3.
Figure 3:
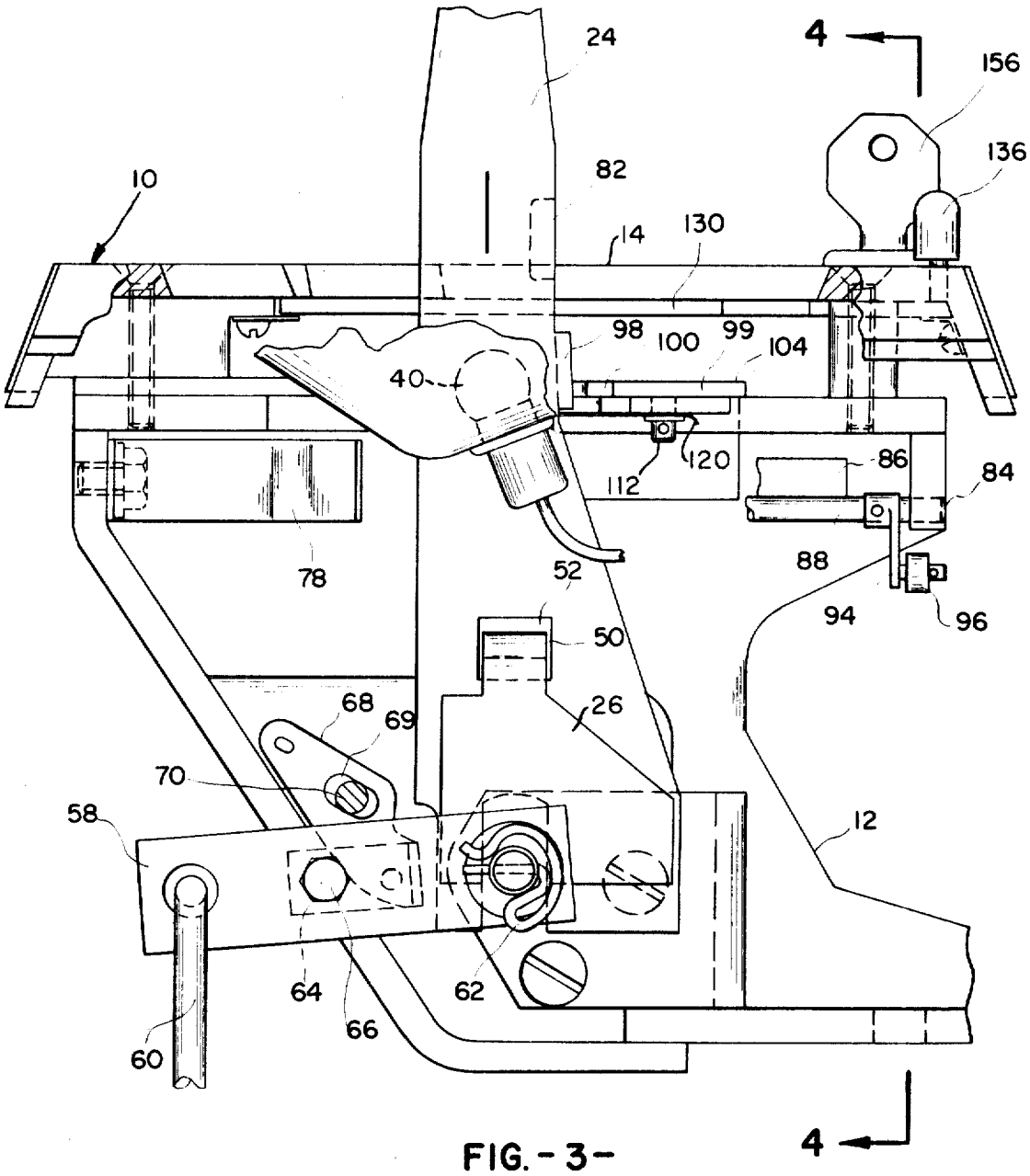
FIG. 3 is a view looking in the direction of line 3—3 on FIG. 1.
Figure 1C:
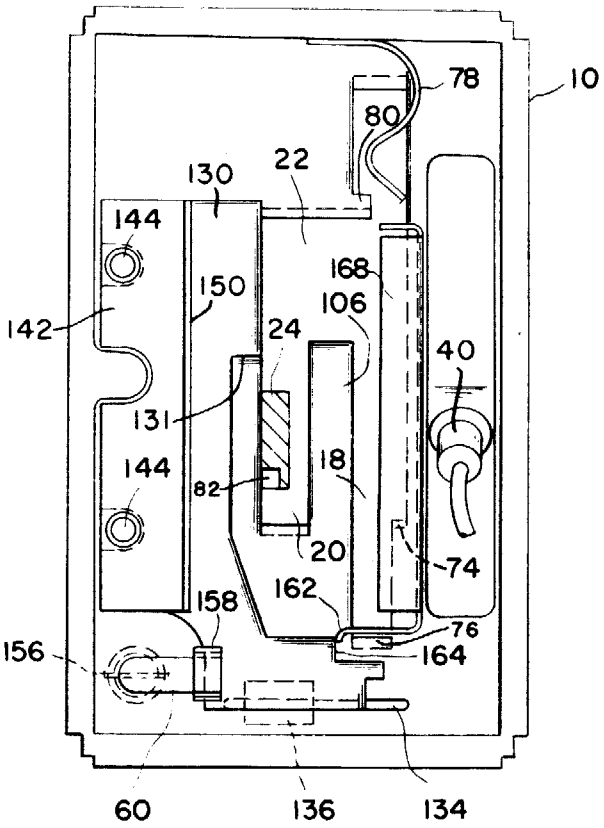
Figure 1B:
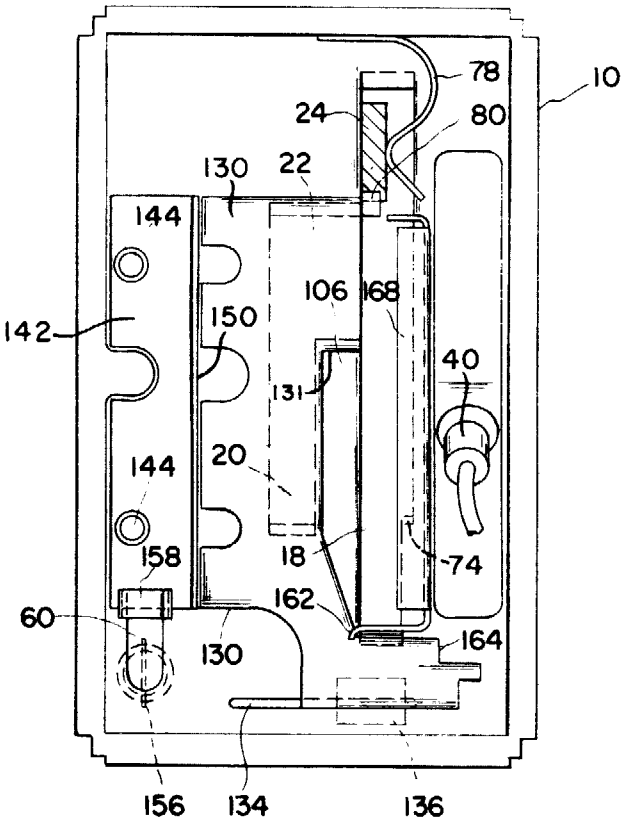

As best shown in FIGS. 3 and 4, the mechanism 84 for locking out the automatic shifting device of the transmission comprises an elongated blade 86 disposed below and along the length of the short slot 20. Blade 86 is carried by rotary rod 88 which is connected by arm 94 to link 96 which is operative, when blade 86 is in the position of FIG. 4, to de-activate the automatic up shifting device and down shift of the transmission.

To insure controlled shifting in competition driving, we provide stick 24 with a transversely extending lug 98, which is successively engageable with lugs or stops 100 and 102 on fixed plate 104 as stick 24 is moved in short slot 20 during up-shifting from low to second gear position and from second to third or high gear position. In other words, stop 100 allows positive stopping in [first] *second* and prevents unintentional shifting from first to second and stop 102 allow positive stopping in [second] *third* and prevents unintentional shifting from second to third gear position. Spring 54 normally biases stick 24 to the left as viewed in FIG. 1, or out of engagement with stops 100 and 102. It will be noted there is enough clearance between lug 98 and stops 100 and 102 to permit stick 24 to be shifted rapidly back and forth in short slot 20 or without ever engaging the stops 100 and 102, if so desired. To shift from a low speed setting into second gear and to hold the transmission in said second gear position, the shift stick 24 is moved to the right, as viewed in FIGS. 1 and 2 so that lug 98 will slide against the edge 99 of plate 104 until it reaches stop 100 which corresponds to position 2 or second speed. It should be noted that if shift stick 24 is released, it will be biased, by spring 54, away from plate 104 and into engagement with divider 106 which separates slot 18 from slot 20.

If a driver shifts to second, for example, and releases the shift stick, or even slackens his hold on it, and if he later tries to shift to position 3, he may, unless he is careful, push the gear shift stick back into engagement with stop 100, or back into second gear position from which the driver has to start all over again. The necessity of being careful and the fact that an occasional mistake can occur, completely destroys the utility of the shift mechanism for completion driving. In order to make it impossible for a driver who has shifted to 2nd position, or to 3rd position, from going back to either of these two positions, we provide a plate 108 which is movably secured to the underside of plate 104 by studs 112 which depend from plate 104 and engage slots 114 in plate 108. Plate 108 is provided with a pair of flat sided lugs 122 and 124 and is normally biased to the right as viewed in FIGS. 8, 9, and 10 by spring 120. Lugs 122 and 124 are larger than stops 100 and 102 and normally present broad flat surfaces which will be engaged by lug 98 on shift stick 24 should the latter be inadvertently returned to a position out of which it has just been moved. For example if the driver shifts to second and releases the shift stick and if he then tries to put the shift stick back into second position, lug 98 will abut lug 122 and will thus inform the driver that he must move the shift stick forwardly or rearwardly as may be. It will be understood that this blocking effect applies only to the movement of the shift stick transversely of gate 20 and that, when the shift stick is moving in upshifting direction along edge 99, lug 98 on the shifting stick will successively engage lugs 122 and 124 and will move plate 108 out of its way against the action of spring 120.

Slidably secured to the underside of top wall 14 is a gate closure 130 which, when moved to the left, as viewed in FIG. 1, or to the position of FIGS. 4 and 7, obstructs slot 20 and cross over slot 22 to confine shift-stick 24 to movement within slot 18, for normal driving, and which, when moved to the right, is out of registration with slot 20 and cross over slot 22 and permits shift stick 24 to be moved into short slot 20 for completion driving.

Figure 5:
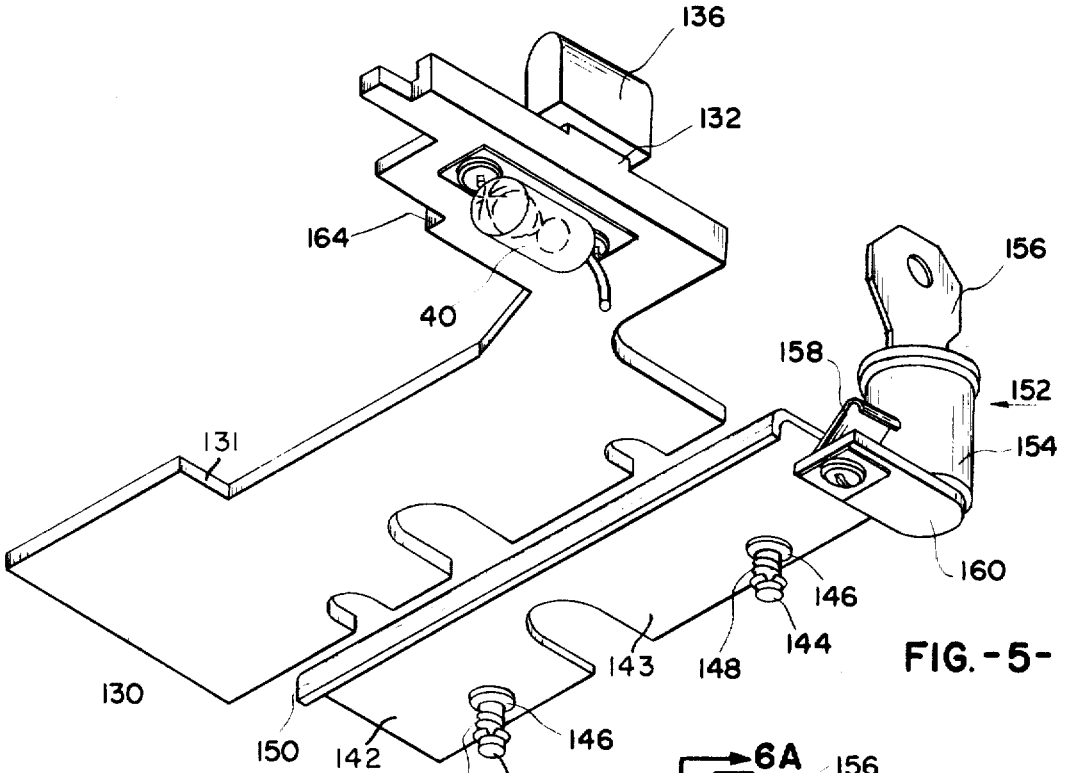
FIG. 5 is a bottom perspective view of the cover which is shown in top plan view in FIG. 1 to show the parts carried by the underside thereof.

For the convenience of the user in moving cover 130 the latter is formed with an upstanding portion 132 which extends through a narrow transverse slot 134 in top wall 14; and a knob 136 is secured at the upper end of the upstanding portion 132. The parts are arranged so that when knob 136 is aligned with plate 38 bearing the marking "Comp.," the cover 130 is withdrawn and the connecting slot 22 and the short slot 20 are opened to the stick 24. In order to close the connecting slot 22 and the short slot 20, the user simply grasps the knob 136 and moves it leftward, as viewed in FIG. 1, into alignment with plate 36 bearing the marking "Normal," and he thereby shifts cover 130 to close connecting slot 22 and short slot 20. Referring now to FIG. 5, electric lamp 40 is carried beneath an opening 138 in cover 130, and the opening 138 and the lamp 40 are arranged to register with an illuminate, whichever plate 36 and 38 is aligned with knob 136. Thus, the user can tell at a glance, even at night whether the shifter apparatus is set for Normal or Competition shifting.

To prevent unintended movement of cover plate 130 into the position of FIGS. 1 and 6, in which slots 20 will be accessible to the sick, we provide the structure shown in FIGS. 5, 6 and 7, which includes a latch plate 142 the function of which is to permit, or to prevent, movement of, cover plate 130 and the lamp 40 from the position of FIG. 7 to the position of FIG. 6. The latch plate is carried by studs 144 which pass through its outer marginal portion 143 and it is normally biased to a horizontal position by springs 148. In this horizontal position, there will be space enough between the top of latch plate 142 and the underside of the top wall 14 of the housing to permit movement of cover plate 130 therebetween or to, and from, the position of FIG. 6 in which lamp 40 illuminates slot 38 to indicate that the gear shift is operating in competitive driving gate 20. Conversely, if plate 142 is tilted, as shown in FIG. 7, its flange 150 will obstruct movement of cover plate 130 from the position of FIG. 7 to the position of FIG. 6 and lamp 40 will illuminate the translucent window 36 of normal driving gate 18. The position of latch plate 142 is controlled by a lock 152 the cylinder 154 of which is rotatable by a key 156 and is provided with a rigid arm 160 which carries a tilted finger or cam 158. See FIG. 5. This arrangement is such that, if the key is turned in counter-clockwise direction, as viewed in FIG. 1, finger 158 will be out of engagement with plate 142 which, under the influence of springs 148, snaps down to its horizontal position to permit movement of cover plate 130 rightwardly, or the position of FIG. 6. When the key is turned in clockwise direction, spring cam 158 yieldably engages the underside of plate 142 near flange 150 and moves it, against the force of springs 148, to the position of FIG. 7 in which flange 150 blocks rightward movement of cover plate 130. In other words, cover plate 130 will be locked in the position of FIG. 7.

As can be seen from FIGS. 1 and 1–C, shift stick 24 will be below edge 131 of plate 130. This means that if the cover plate can be moved from the position of FIG. 1–a, the shift stick will be trapped, or confined in slot 20. In order to prevent cover 130 from being inadvertently moved out of slot 20 and in to slot 18, or from Competition driving to Normal we provide a blocking member 162 which is movable to the position shown in phantom lines in FIG. 4 in which it abuts edge 164 of plate 130, to prevent leftward movement of plate 130. See FIG. 5. Blocking member 162 is pivotally mounted at 166 and is connected to an elongated blade 168 which extends substantially the length of slot 18. When the shift-stick 24 is operating in the competition slot 20, the edge of blocking member 162 engages cover plate 130, as above set forth. But, when the shift stick is moved out of slot 20, and into cross over opening 22, it engages blade 168 and moves it and blocking member 162 to the solid line position of FIG. 4 in which said member is out of engagement with plate 130. In this position of member 162, plate 130 is movable to the left so as to block slot 20 and cross over 22. With plate 130 moved out from between yielding plate 142 and top wall 14, the lock cylinder can be turned to move the free end of plate 142 upwardly in which the flange 150 of plate 142 abuts the edge of plate 130 and prevents rightward movement of plate 130 as clearly shown in FIG. 7.

While the invention has been shown in but one form, it will be obvious to those skilled in the art that the invention is not so limited, but it is susceptible of various changes and modifications without departing from the spirit thereof.

We claim:

[1. A gear shift mechanism including
- a gear shift stick
- means defining a first operating position in which said shift stick is movable in up-shifting, in downshifting and in reverse direction
- means defining a second operating position in which said gear shift stick is movable in up shifting or downshifting direction only
- means mounting said gear shift stick for movement to one position or the other
- and confining means for retaining said shift stick in said first operating position.]

2. Apparatus for shifting a transmission comprising:
- a housing having a top wall,
- a shift stick,
- a first elongated slot formed in said top wall,
- a second elongated slot also formed in said top wall and parallel to said first slot,
- a third slot also formed in said top wall and extending transversely of said slots and connecting said first slot with said second slot,
- means mounting said stick for movement in either of said slots and for movement from one slot to another,
- a cover plate movable to a first position in which it is out of registration with all of said slots and to a second position in which it obstructs said third slot, and means for locking said slide plate in said second position.

3. The combination with transmission having multiple settings among which are forward speed settings, and automatic means for shifting said transmission between said multiple settings, of:
- a housing having a top wall,
- actuating means including a shift stick for shifting said transmission from one to another of said multiple settings,
- a first slot formed in said top wall for guiding the movement of said shift stick between said multiple settings,
- a second slot also formed in said top wall and disposed parallel to said first slot for guiding the movement of said shift stick between said forward speed settings,
- a cross over slot also formed in said top wall and connecting said first and second slot,
- means selectively movable between a first position for unobstructing said cross over slot and a second position for obstructing said cross over slot,
- and means responsive to movement of said stick in said second slot for de-activating said automatic shifting means.

4. The combination according to claim 3 including a latch for securing said selectively movable means in second position.

5. The combination according to claim 3 and means operative when said shift stick is in said second slot for preventing said selectively movable means from moving from said first position to said second position.

6. In shifter apparatus, the combination of:
- a movable shift stick,
- stationary wall structure provided with an elongated slot for receiving said stick and guiding the movement thereof through a series of stations,
- a stationary stop having a leading edge positioned to engage said stick as it moves in a first direction from one station to another for positioning said stick in said other station, a plate supported for movement in longitudinal direction relative to said slot, means biasing said plate in a second direction opposite to said first direction of said stick, said plate having a blocking lug formed thereon, said blocking lug being normally positioned closer than said stop to said one station so as to be engaged and shifted against the bias of said biasing means into registry with said stop by said stick as said stick moves from one station to another station, said blocking lug being returned with said plate to normal position by said biasing means when said stick is in said other station and is moved laterally of said slot out of engagement with said blocking lug and the leading edge of said stop.

7. The combination according to claim 6 wherein said blocking lug provides a laterally facing abutment surface which is presented to said shift stick when said shift stick is positioned in said other station, said blocking lug blocking said shift stick from engaging the leading edge of said stop when said latch is in normal position and said shift stick is being moved from said other station further in said first direction.

8. The combination according to claim 6 wherein said slot is sufficiently wide to accommodate said shift stick for movement along the length of said slot with clearance between said shift stick and said stop and blocking lug.

9. The combination according to claim 6 including second biasing means biasing said shift stick laterally of said slot away from said stop and said blocking lug.

*10. Apparatus comprising:*

*(a) a fixed stop,*

*(b) a rigid member movable along a predetermined path into a predetermined position defined by said stop and also movable laterally thereof, and*

*(c) means for preventing movement of said rigid member substantially transversely to said path into said predetermined position.*

*11. The apparatus according to claim 10 wherein said preventing means is yieldable only in response to pressure exerted thereupon in the direction of said path and allows movement of said rigid member laterally of said path out of said predetermined position.*

*12. In gear shift apparatus the combination comprising:*

*(a) a shift stick movable along a predetermined path and also laterally thereof,*

*(b) a fixed stop for defining a predetermined position of said shift stick, and*

*(c) means cooperating with said stick and stop for preventing movement of said stick substantially transverse to said path into said predetermined position, said means enabling movement of said stick into said predetermined position only when said stick is moved along said predetermined path and also enabling movement of said stick laterally of said path out of said predetermned poston.*

*13. The combination according to claim 12 wherein said (c) means yields to pressure exerted by said stick in the direction of said path but does not yield when said stick is moved transversely to said path into contact therewith.*

*14. A gear shift mechanism including:*

*(a) a gear shift stick,*

*(b) means defining a first operating position in which said shift stick is movable,*

*(c) means defining a second operating position in which said gear shift stick is movable,*

*(d) means mounting said gear shift stick for movement to one or the other operating position, and*

*(e) movable confining means independent of said stick for preventing movement thereof in a predetermined one of said operating positions, said preventing means also being movable to allow movement of said stick in said predetermined operating position.*

References Cited

The following references, cited by the Examiner, are of record in the patented file of this patent or the original patent.

UNITED STATES PATENTS

| | | | |
|---|---|---|---|
| 1,151,897 | 8/1915 | Munsing | 74—475 |
| 2,917,941 | 12/1959 | Written | 74—473 |
| 3,031,898 | 5/1962 | Eaton | 74—473 |
| 3,184,989 | 5/1965 | Rhodes | 74—471 |

MILTON KAUFMAN, Primary Examiner

U.S. Cl. X.R.

74—566